United States Patent
Li et al.

(10) Patent No.: US 7,288,281 B2
(45) Date of Patent: Oct. 30, 2007

(54) CPP SPIN VALVE WITH ULTRA-THIN COFE(50%) LAMINATIONS

(75) Inventors: Min Li, Dublin, CA (US); Kunliang Zhang, Santa Clara, CA (US); Cheng T. Horng, San Jose, CA (US); Chyu Jiuh Torng, Pleasanton, CA (US); Yu-Hsia Chen, San Jose, CA (US); Ru-Ying Tong, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 378 days.

(21) Appl. No.: 10/933,031

(22) Filed: Sep. 2, 2004

(65) Prior Publication Data

US 2006/0044704 A1    Mar. 2, 2006

(51) Int. Cl.
B05D 5/12    (2006.01)

(52) U.S. Cl. .................. 427/127; 427/128; 427/131; 360/342.12

(58) Field of Classification Search ............. 427/127, 427/128, 131; 360/342.12
See application file for complete search history.

(56) References Cited

U.S. PATENT DOCUMENTS

| | | | |
|---|---|---|---|
| 5,627,704 A | 5/1997 | Lederman et al. ......... | 360/113 |
| 5,668,688 A | 9/1997 | Dykes et al. ............... | 360/113 |
| 6,171,693 B1 | 1/2001 | Lubitz et al. ............... | 428/332 |
| 6,525,911 B1 * | 2/2003 | Gill ........................... | 360/319 |
| 6,680,831 B2 * | 1/2004 | Hiramoto et al. ...... | 360/324.11 |
| 6,710,984 B1 | 3/2004 | Yuasa et al. ........... | 360/324.11 |
| 6,714,388 B2 | 3/2004 | Hasegawa et al. ..... | 360/324.11 |

OTHER PUBLICATIONS

"Output Enhancement of Spin-Valve Giant Magnetoresistance in Current-Perpendicular-to-Plane Geometry", by Yuasa, et al. Jrnl. of App. Physics, vol. 92, No. 5, Sep. 1, 2002, pp. 2646-2650.
Co-pending U.S. Appl. No. 10/845,888, filed May 14, 2004, "Free Layer Design for CPP GMR Enhancement," assigned to the same assignee.

* cited by examiner

*Primary Examiner*—Alain L. Bashore
(74) *Attorney, Agent, or Firm*—Saile Ackerman LLC; Stephen B. Ackerman

(57) ABSTRACT

Fe rich CoFe can be used in AP1 to enhance CPP GMR. However, this is found to degrade the electro-migration performance of the device. This problem has been solved by using an AP1 that is a laminate of several CoFe(25%) layers, separated from one another by copper layers. Ultra-thin layers of iron-rich CoFe are then inserted at all the copper-CoFe interfaces.

18 Claims, 1 Drawing Sheet

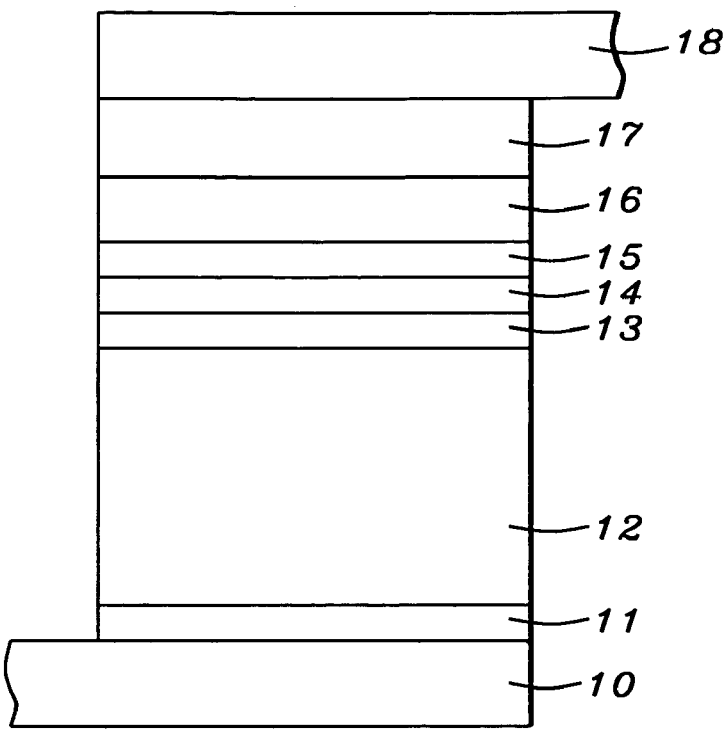
FIG. 1 – Prior Art
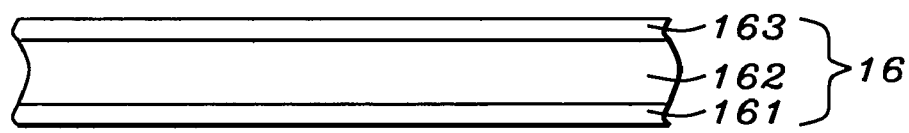
FIG. 2 – Prior Art
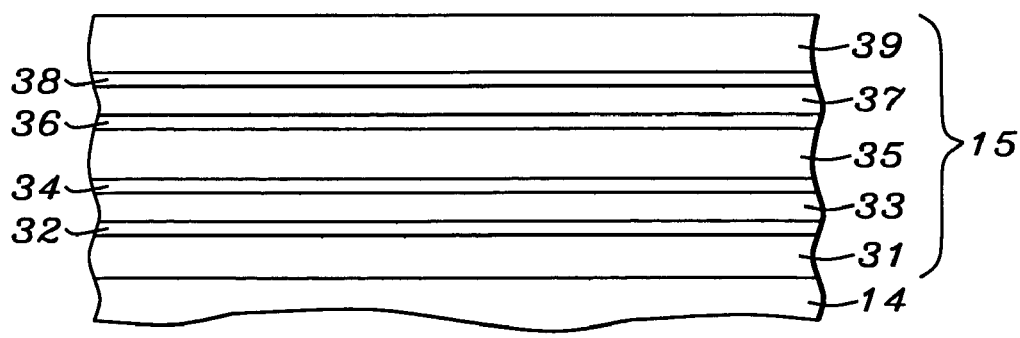
FIG. 3

CPP SPIN VALVE WITH ULTRA-THIN COFE(50%) LAMINATIONS

FIELD OF THE INVENTION

The invention relates to the general field of CPP GMR read heads with particular reference to the AP1 portion of the pinned layer.

BACKGROUND OF THE INVENTION

The principle governing the operation of most magnetic read heads is the change of resistivity of certain materials in the presence of a magnetic field (magneto-resistance or MR). Magneto-resistance can be significantly increased by means of a structure known as a spin valve where the resistance increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve are illustrated in FIG. 1. They are a substrate 10, which could be a lower magnetic shield and/or a lower lead, on which is seed layer 11. Antiferromagnetic (AFM) layer 12 is on seed layer 11. Its purpose is to act as a pinning agent for a magnetically pinned layer. The latter is typically a synthetic antiferromagnet formed by sandwiching antiferromagnetic coupling layer 14 between two antiparallel ferromagnetic layers 13 (AP2) and 15 (AP1).

Next is a non-magnetic spacer layer 16 on which is low coercivity (free) ferromagnetic layer 17. One of the important parameters that defines a CPP device is R.A, the resistance area product. This can be improved by means of a spacer layer that comprises an NOL (nano-oxide layer) 162 sandwiched between two layers of copper 161 and 163, as shown in FIG. 2. Since conduction between the two copper layer occurs only where there are pin-holes in the NOL, a higher transverse resistance is obtained without any reduction in overall device area.

Capping layer 18 lies atop free layer 17. When free layer 17 is exposed to an external magnetic field, the direction of its magnetization is free to rotate according to the direction of the external field. After the external field is removed, the magnetization of the free layer will stay at a direction, which is dictated by the minimum energy state, determined by the crystalline and shape anisotropy, current field, coupling field and demagnetization field.

If the direction of the pinned field is parallel to the free layer, electrons passing between the free and pinned layers suffer less scattering. Thus, the resistance in this state is lower. If, however, the magnetization of the pinned layer is anti-parallel to that of the free layer, electrons moving from one layer into the other will suffer more scattering so the resistance of the structure will increase.

Earlier GMR devices were designed to measure the resistance of the free layer for current flowing parallel to its two surfaces. However, as the quest for ever greater densities has progressed, devices that measure current flowing perpendicular to the plane (CPP) have also emerged. CPP GMR heads are considered to be promising candidates for the over 100 Gb/in$^2$ recording density domain (see references 1-3 below).

It is known [3] that Fe rich CoFe such as CoFe(50%), when used in AP1 or the free layer, can enhance CPP GMR due to high spin polarization. However, it has also been found that using CoFe(50%) for AP1 resulted in poor EM (electro-migration) and larger device to device variation. We believe this happens because CoFe(50%) has a preferred bcc crystalline orientation whereas typical spin valve seed layers prefer an fcc type growth orientation.

The present invention discloses a way to overcome this problem

A routine search of the prior art was performed with the following references of interest being found:

In U.S. Pat. No. 6,714,388, Hasegawa et al. disclose that a CoFe layer having a Fe per-centage of greater than 15 degrades magnetic performance. U.S. Pat. No. 6,710,984 (Yuasa et al.) discloses a CoFe. layer having a Fe percentage of 10. Lubitz et al. disclose a CoFe layer having a Fe percentage of 5 in U.S. Pat. No. 6,171,693. No references that teach an Fe percentage of greater than 50 were found.

References
[1] M. Lederman et al. U.S. Pat. No. 5,627,704.
[2] J. W. Dykes et al. U.S. Pat. No. 5,668,688
[3] H. Yuasa et al. J. A. P. 92 2002 p. 2646

SUMMARY OF THE INVENTION

It has been an object of at least one embodiment of the present invention to provide a CPP GMR magnetic read head having an improved GMR ratio.

A further object of at least one embodiment of the present invention has been to provide a process for manufacturing said read head.

Another object of at least one embodiment of the present invention has been that said process lead to reduced device-to-device variations during manufacturing.

Still another object of at least one embodiment of the present invention has been that said process be compatible with existing processes for the manufacture of CPP GMR devices.

These objects have been achieved by using an AP1 that is a laminate of several CoFe(25%) layers, separated from one another by copper layers. Ultra-thin layers of iron-rich CoFe are then inserted at all the copper-CoFe interfaces.

BRIEF DESCRIPTION OF THE DRAWINGS

FIG. 1 shows a GMR stack of the prior art in which has a conventional AP1 layer.

FIG. 2 provides a more detailed view of the non-magnetic spacer layer of FIG. 1.

FIG. 3 is a detailed cross-section of the improved AP1 layer of the present invention.

DESCRIPTION OF THE PREFERRED EMBODIMENTS

It is known that in CPP spin valve structures interface scattering, as well as bulk scattering, contributes to GMR. The present invention makes use of this by depositing an ultra-thin layer on top of the conventional under-layer so as to influence subsequent film growth. This increases the CPP GMR ratio while maintaining the basic CoFe(25%) growth structure.

We now disclose the present invention through a description of a process for its manufacture. Referring initially to FIG. 1, the process begins with the provision of substrate 10 and depositing thereon seed layer 11. A pinning (AFM) layer 12 of IrMn is laid down on seed layer 11 to a thickness between 30 and 70 Angstroms, followed by AP2 layer 13.

Then, AFM coupling layer 14 is deposited onto AP2 layer 13. The latter is a material such as CoFe (more specifically $FeCO_3$) and is deposited to a thickness between about 20 and 60 Angstroms.

At this point in the process the key novel feature of the invention (the formation of an improved AP1) is introduced, as illustrated in FIG. 3. It begins with the deposition of layer of cobalt-rich CoFe 31 on layer 14 of AFM coupling material. This is followed by depositing layer 32 of iron-rich CoFe, between about 0.5 and 2 Angstroms thick, onto layer 31 of cobalt-rich CoFe. Note that in this context the term 'iron-rich CoFe' implies that the iron concentration in the CoFe layer is at least 50 atomic percent of iron while the cobalt-rich CoFe layers contain up to 30 atomic percent of iron, with 10-25 atomic percent iron being preferred. Typically, these cobalt-rich CoFe layers are between about 8 and 20 Angstroms thick.

Next, copper layer 33 (typically between about 1 and 4 Angstroms thick) is deposited onto layer 32 of iron-rich CoFe followed by the deposition onto layer 33 of layer 34 of iron-rich CoFe which also has a thickness between about 0.5 and 2 Angstroms. Layer 35 of cobalt-rich CoFe is then deposited onto layer 34 of iron-rich CoFe followed by the deposition onto it of a third layer of iron-rich CoFe (layer 36), also between about 0.5 and 2 Angstroms thick.

Formation of the improved AP1 continues with the deposition onto layer 36 of second copper layer 37 followed by the deposition thereon of the fourth (and last) layer of iron-rich CoFe having a thickness between about 0.5 and 2 Angstroms (layer 38). To complete AP1, layer 39 of cobalt-rich CoFe is then deposited onto layer 38.

Formation of the read head then concludes with the successive deposition of non-magnetic spacer layer 16, free layer 17 (of a material such as CoFe, CoFe/NiFe, or $FeCO_3$/NiFe between about 20 and 60 Angstroms thick), and capping layer 18 (of a material such as Cu/Ta, Cu/Ru, Cu/Ru/Ta, or Cu/Ru/Ta/Ru), as illustrated in FIG. 1.

Confirmatory Results

A number of structures were evaluated by experiment, as follows:

Group 1
A1. (reference 1) Ta5/NiCr45/IrMn70/CoFe(25%)36/Ru7.5/[CoFe(25%)12/Cu2]2/CoFe (25%) Co12/Cu2.6/AlCu8/PIT/IAO/Cu2/CoFe(10%)12/NiFe35/Cu30/Ru10/Ta60/Ru10
B1. Ta5/NiCr45/IrMn70/CoFe(25%)36/Ru7.5/AP1/Cu2.6/AlCu8/PIT/IAO/Cu2/CoFe (10%)12/NiFe(17%)35/Cu30/Ru10/Ta60/Ru10
  where AP1=CoFe(25%)11/CoFe(50%)1/Cu2/CoFe(50%)1/CoFe(25%)10/CoFe(50%)1/Cu2/CoFe(50%)1/CoFe(25%)11
C1. Ta5/NiCr45/IrMn70/CoFe(50%)36/Ru7.5/[CoFe(50%)12/Cu2]2/CoFe(50%) Co12/Cu4.2/AlCu8.0/PIT/IAO/O₂CoFe(10%)12/NiFe(17%)35/Cu30/Ru10/Ta60/Ru10
X. Ta5/NiCr45/IrMn70/Fe25Co30/Ru7.5/AP1/PIT/IAO/Cu2/CoFe12/NiFe35/Cu30/Ru10/Ta60/Ru10
  where PIT is: 20w, 50 sccm Ar plasma etch for 40 seconds and IAO is plasma oxidation 27 W, 50 sccm Ar, 1 sccm $O_2$ for 30 seconds and, in the embodiments listed below, AP1 and Cu/AlCu have the following structures and thicknesses respectively, in X:

AP1:
D1 (reference 2). [CoFe12/Cu2]2/CoFe12
E1, F1, & G1) $CoFe_{11}/Fe_{50}Co1/Cu_2/Fe_{50}Co_1/CoFe_{10}/Fe50Co1/Cu$ Cu/AlCu in the Above Structures Varied as Follows:
D1 & E1.) 2.618.012.6
F1 & G1.) 3.2/8.5/3.2
The results are summarized in TABLE I:

TABLE I

| Structure | R.A (ohm · µm²) | DR/R(%) |
|---|---|---|
| A1 | 0.4 | 6 |
| B1 | 0.5 | 7 |
| C1 | 0.5 | 7 |
| D1 | 0.61 | 5.3 |
| E1 | 0.54 | 6 |
| F1 | 0.53 | 6.1 |
| G1 | 0.5 | 6.5 |

Although examples E, F, and G are slightly less effective than examples B and C, they offer the advantages over B and C of reduced electro-migration.

Group 2:
A2. (reference 3) Ta5/NiCr45/IrMn70/Fe25Co30/Ru7.5/AP1/Cu/Al/Cu/Cu/PIT/IAO/Cu2/CoFe12/NiFe35/Cu30/Ru10/Ta60/Ru10 (CoFe is Co90% Fe10%)
AP1 varied (in structure A2 above) as follows:
B2. (reference 4) [CoFe12/Cu2]2/CoFe12
C2. CoFe11/Fe50Co1/Cu2/Fe50Co1/CoFe10/Fe50Co1/Cu2/Fe50Co1/CoF e11
D2. CoFe11/Fe50Co1/Cu2/Fe50Co1/CoFe10/Fe50Co1/Cu2/Fe50Co1/CoF e11
E2. CoFe11/Fe50Co1/Cu2/Fe50Co1/CoFe10/Fe50Co1/Cu2/Fe50Co1/CoF e11/Fe50Co1

Thickness variations in Cu/Al/Cu In structures B2-E2 are featured in TABLE II below:

TABLE II

| Structure | Cu/Al/.Cu | R.A (ohm · µm²) | DR/R(%) |
|---|---|---|---|
| B2 | 2.6/8.0/2.6 | 0.61 | 5.3 |
| C2 | 2.6/8.0/2.6 | 0.54 | 6 |
| D2 | 3.2/8.5/3.2 | 0.53 | 6.1 |
| E2 | 3.2/8.5/3.2 | 0.5 | 6.5 |

What is claimed is:
1. A method to form an AP1 structure for a spin valve, comprising:
  depositing onto a substrate a first layer of cobalt-rich CoFe;
  depositing a first layer of iron-rich CoFe, between about 0.5 and 2 Angstroms thick, onto said first layer of cobalt-rich CoFe;
  depositing, on said first layer of iron-rich CoFe, a first copper layer;
  depositing, on said first copper layer, a second layer of iron-rich CoFe having a thickness between about 0.5 and 2 Angstroms;
  depositing a second layer of cobalt-rich CoFe onto said second layer of iron-rich CoFe;
  depositing a third layer of iron-rich CoFe, between about 0.5 and 2 Angstroms thick, onto said second layer of cobalt-rich CoFe;
  depositing, on said third layer of iron-rich CoFe, a second copper layer;
  depositing, on said second copper layer, a fourth layer of iron-rich CoFe having a thickness between about 0.5 and 2 Angstroms; and depositing a third layer of cobalt-rich CoFe onto said fourth layer of iron-rich CoFe, thereby completing formation of said AP1 layer.

2. The method of claim 1 wherein said substrate is an AFM coupling layer selected from the group consisting of Ru and Rh.

3. The method of claim 1 wherein all of said cobalt-rich CoFe layers contain between about 10 and 25 atomic percent of iron.

4. The method of claim 1 wherein each of said cobalt-rich CoFe layers is between about 8 and 20 Angstroms thick.

5. The method of claim 1 wherein each of said copper layers is between about 1 and 4 Angstroms thick.

6. A process to manufacture a CPP GMR read head, comprising:

providing a substrate and depositing thereon a seed layer;

depositing a layer of IrMn on said seed layer;

on said IrMn layer, depositing an AP2 layer;

depositing a layer of AFM coupling material on said AP2 layer;

depositing a first layer of cobalt-rich CoFe on said layer of AFM coupling material;

depositing a first layer of iron-rich CoFe, between about 0.5 and 2 Angstroms thick, onto said first layer of cobalt-rich CoFe;

depositing, on said first layer of iron-rich CoFe, a first copper layer;

depositing, on said first copper layer, a second layer of iron-rich CoFe having a thickness between about 0.5 and 2 Angstroms;

depositing a second layer of cobalt-rich CoFe onto said second layer of iron-rich CoFe;

depositing a third layer of iron-rich CoFe, between about 0.5 and 2 Angstroms thick, onto said second layer of cobalt-rich CoFe;

depositing, on said third layer of iron-rich CoFe, a second copper layer;

depositing, on said second copper layer, a fourth layer of iron-rich CoFe having a thickness between about 0.5 and 2 Angstroms;

depositing a third layer of cobalt-rich CoFe onto said fourth layer of iron-rich CoFe, thereby forming an AP1 layer;

depositing a non-magnetic spacer layer on said AP1 layer;

then depositing a free layer on said non-magnetic spacer layer; and forming a capping layer on said free layer.

7. The process of claim 6 wherein all of said cobalt-rich CoFe layers contain between about 10 and 25 atomic percent of iron.

8. The process of claim 6 wherein each of said cobalt-rich CoFe layers is between about 8 and 20 Angstroms thick.

9. The process of claim 6 wherein each of said copper layers is between about 1 and 4 Angstroms thick.

10. The process described in claim 6 wherein said IrMn layer is deposited to a thickness between 40 and 80 Angstroms.

11. The process described in claim 6 wherein said CPP GMR read head has a GMR ratio greater than 6%.

12. The process described in claim 6 wherein said AP2 layer is selected from the group consisting of CoFe and $CoFe_3$.

13. The process described in claim 6 wherein said AP2 layer has a thickness between about 20 and 60 Angstroms.

14. The process described in claim 6 wherein said free layer is selected from the group consisting of CoFe, CoFe/NiFe, and $FeCo_3$/NiFe.

15. The process described in claim 6 wherein said free layer has a thickness between about 20 and 60 Angstroms.

16. The process described in claim 6 wherein said capping layer is selected from the group consisting of Co/Ru, Cu/Ru/Ta, Cu/Ta, and Cu/Ru/Ta/Ru.

17. The process described in claim 6 wherein the step of depositing a non-magnetic spacer layer on said AP1 layer further comprises forming a laminate of AlCu between two copper layers and converting said AlCu layer to a nano-oxide layer.

18. An AP1 layer for a spin valve, comprising:

a first layer of cobalt-rich CoFe on a substrate;

a first layer of iron-rich CoFe, between about 0.5 and 2 Angstroms thick, on said first layer of cobalt-rich CoFe;

a first copper layer on said first layer of iron-rich CoFe;

on said first copper layer, a second layer of iron-rich CoFe having a thickness between about 0.5 and 2 Angstroms;

a second layer of cobalt-rich CoFe on said second layer of iron-rich CoFe;

a third layer of iron-rich CoFe, between about 0.5 and 2 Angstroms thick, on said second layer of cobalt-rich CoFe;

a second copper layer on said third layer of iron-rich CoFe,;

on said second copper layer, a fourth layer of iron-rich CoFe having a thickness between about 0.5 and 2 Angstroms; and a third layer of cobalt-rich CoFe on said fourth layer of iron-rich CoFe.

* * * * *